United States Patent [19]
Barrett

[11] Patent Number: 5,684,678
[45] Date of Patent: Nov. 4, 1997

[54] RESONANT CONVERTER WITH CONTROLLED INDUCTOR

[75] Inventor: Alfred Henry Barrett, Carmel, Ind.

[73] Assignee: Delco Electronics Corp., Kokomo, Ind.

[21] Appl. No.: 569,894

[22] Filed: Dec. 8, 1995

[51] Int. Cl.$^6$ .................................................. H02M 3/335
[52] U.S. Cl. .................................................. 363/17
[58] Field of Search .................................. 363/17, 39, 40, 363/98, 132

[56] References Cited

U.S. PATENT DOCUMENTS 4,679,129  7/1987  Sakakibara et al. ...................... 363/17

*Primary Examiner*—Aditya Krishnan
*Attorney, Agent, or Firm*—Mark A. Navarre

[57] ABSTRACT

An LC resonant circuit for a resonant converter includes a resonant capacitor and an inductor coupled to a fixed frequency AC supply. A controlled inductor in parallel with the resonant capacitor is controlled by a DC current to vary its inductance. The controlled inductor comprises a magnetic core having one or more power windings, and a control winding wound on the core. The DC current in the control winding produces core flux which effects core permeability. The controlled inductor has the effect of changing the capacitor impedance and thus influences the converter output. Multiple, independently controlled and regulated outputs may be driven by one power switching stage.

18 Claims, 6 Drawing Sheets

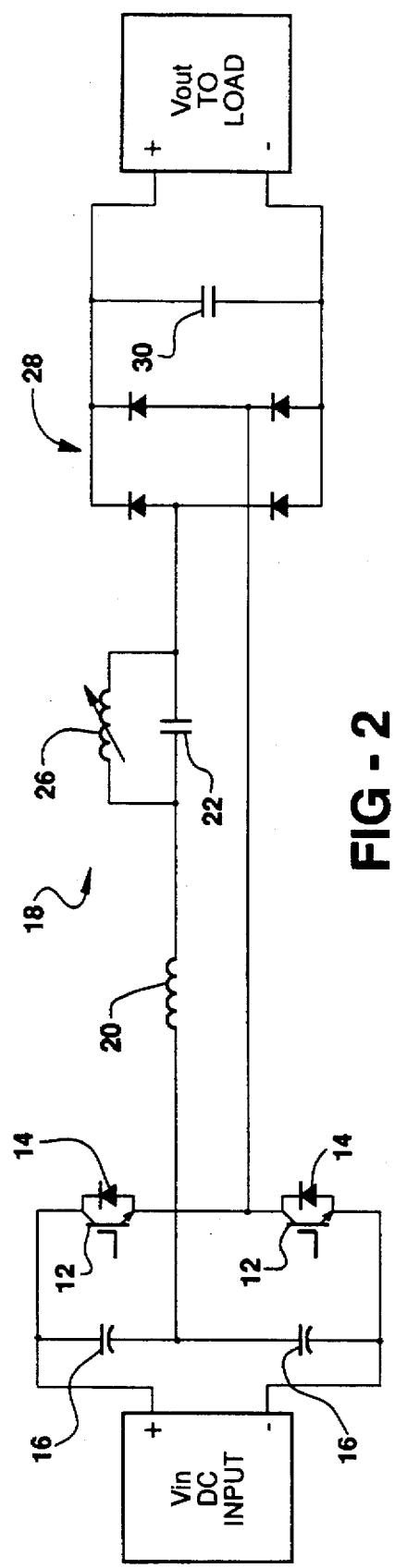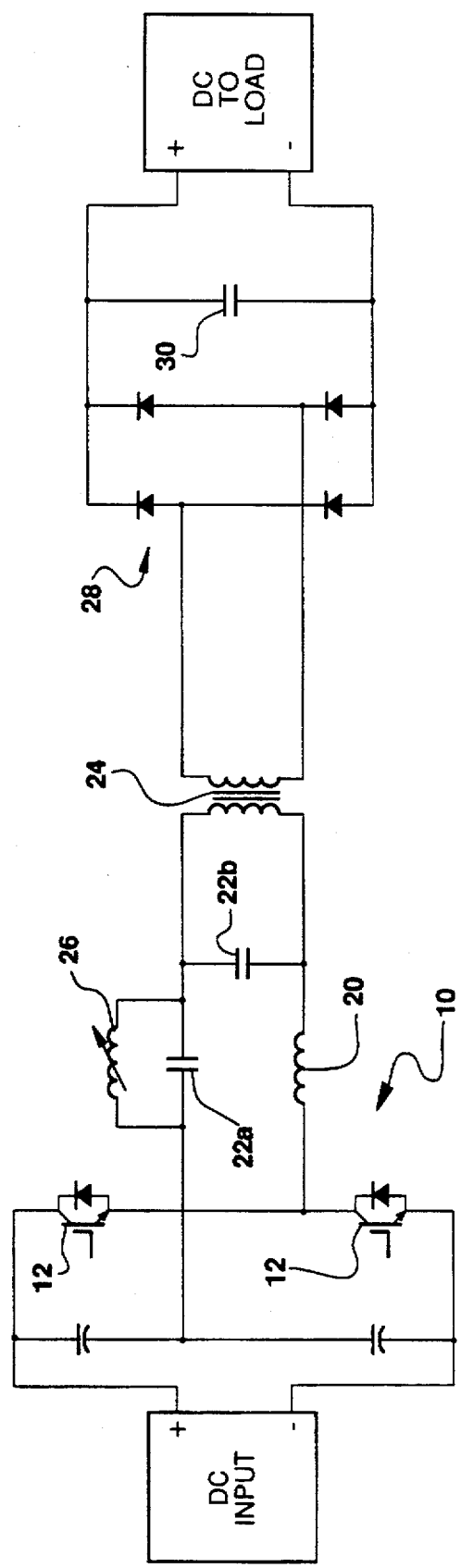
FIG - 2
FIG - 3

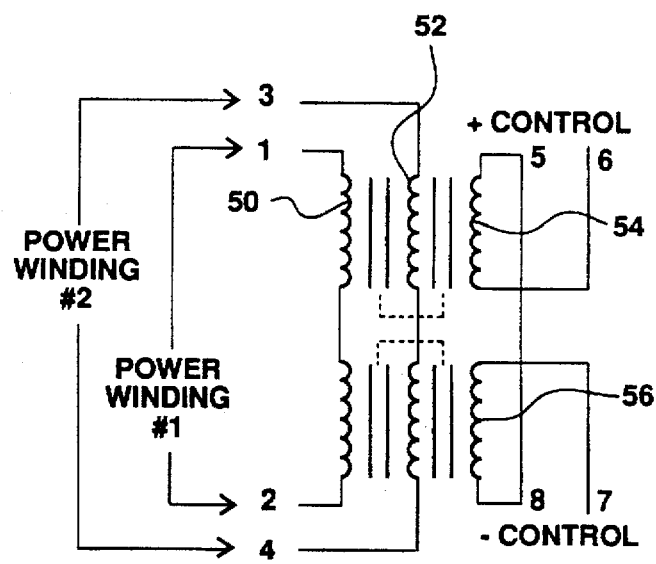
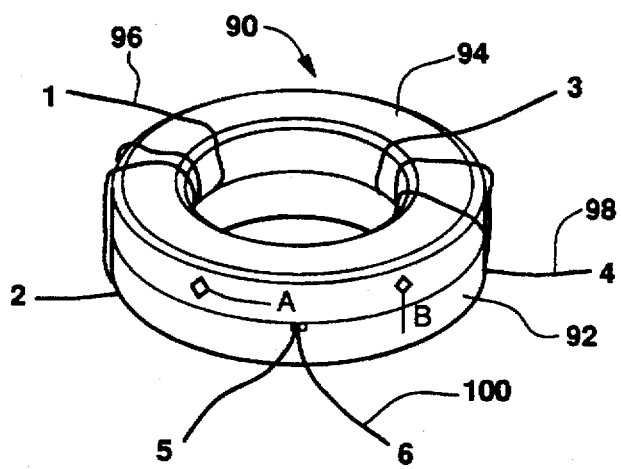
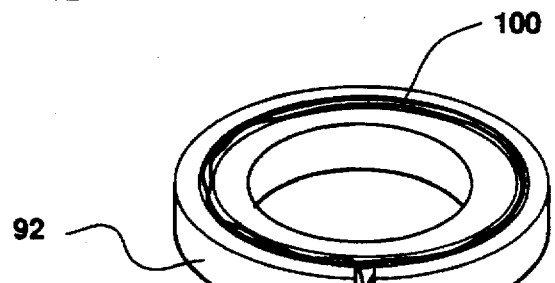
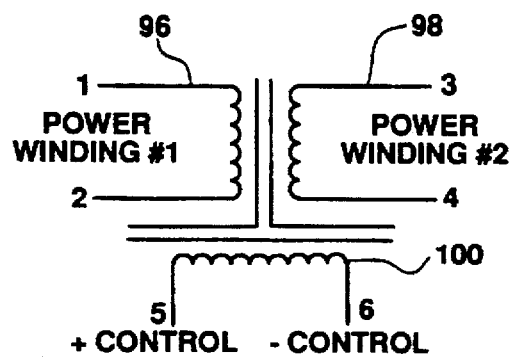

RESONANT CONVERTER WITH CONTROLLED INDUCTOR

FIELD OF THE INVENTION

This invention relates to a resonant converter and particularly to such a converter employing a controlled inductor for regulating the output voltage.

DESCRIPTION OF THE RELATED ART

DC to DC power converters are commercially employed in a myriad of applications including battery chargers, communication systems, electric furnaces, electric tools, personal computers, and electric toys, to name a few. The control or regulation of the output of such converters has been accomplished by a variety of devices, including pre-regulation with devices such as pulse width modulation (PWM) inverters, saturable reactors, magnetic amplifiers, and ferroresonant regulators. For PWM inverters, the pulse width of the original input to the converter is adjusted to result in a change in the converter's output.

Saturable reactors, which may be employed in magnetic amplifiers and ferroresonant regulators, operate on the general principle that a change in the degree of saturation of the core may be accomplished by adjusting the direct current provided to an additional core winding. The core of a saturable reactor is generally magnetically hard such that saturation results in switching of the device. Magnetic amplifiers modulate the flow of alternating current to a load in response to a DC input signal. In ferroresonant regulators, such as those disclosed in U.S. Pat. Nos. RE28,359, 3,148,328, RE27,916, 3,573,605, 3,573,606 and 3,965,408, for example, tuning is accomplished by varying circuit voltage or current. Consider, for example, the closed loop ferroresonant regulator of U.S. Pat. No. RE28,359, wherein the output voltage of the regulator is adjusted by varying the rate of charge of the integrating capacitor.

Resonant converters are also employed in power conversion applications for control and regulation and are advantageous over PWM inverters, saturable reactors, magnetic amplifiers and ferroresonant regulators in many respects. Theoretically, there is no switching loss with a series resonant converter when the waveform of the current flowing through the circuit's switch element is sinusoidal and goes through zero such that the switch element need not forcibly turn the current on or off. Also, less noise is produced with resonant converters than with other types of converters. Further, the output current of resonant converters is essentially constant over a range of output voltage to allow the converter to be protected in the event of an overload or a short circuit in the load.

Though the basic concepts involving resonance in electrical circuits were developed during the early days of the development of radio technology over fifty years ago, the evolution of resonant technology has been generally limited to the resolution of specific problems. A brief look at the history of power supplies is instructional when comparing PWM converters to resonant converters.

Early power supplies often used a line frequency power transformer and a linear regulator consisting of vacuum tubes or, in later supplies, power transistors. These early power supplies were generally large, heavy and inefficient. DC—DC type power supplies used mechanical vibrators, vacuum tubes or switching power transistors to accomplish inversion (DC to AC transformation) when isolation or a significant voltage transformation was required. When vacuum tubes or switching transistors were employed, the regulation function of the power supply was often accomplished by PWM or by pulse-frequency modulation. The introduction of silicon power transistors, which were capable of dissipating several hundred watts and switching in a few microseconds, had an impact on the popularity of PWM for regulation. Today, PWM still prevails as the means for regulating a majority of commercially available power supplies.

The availability of high speed silicon power transistors resulted in the emergence of PWM power supplies having increasingly higher feasible power levels. However, these power supplies were generally limited to only a few kilowatts. In the late 1960's, the silicon controlled rectifier, SCR, became available for use in operation at several kilowatts and above. However, because the SCR has no means by which it can interrupt its own current flow, i.e., self-commutate, forced commutation was necessary for the SCR to operate in DC systems. The need for forced commutation prompted the development of resonant circuits in which ringing is used to produce a reversal in current flow. Similarly, since the mid-1980's, resonant power technology is utilized with increased frequency in power circuits due to the introduction of other switching devices such as bipolar transistors, MOSFETs, IGBTs, etc. Though these devices, unlike SCRs, do not necessarily require the use of resonance, resonance can be employed where it is advantageous over PWM.

When operated at the resonant frequency of its tank circuit (the combination of inductive and capacitive elements), the series resonant converter has a pure sine wave of tank current at that frequency. Therefore, at the time the square wave of excitation voltage produces a voltage transition on its power switching devices, series resonant converters are not necessarily conducting current. Low switching losses are produced in these devices when the current is zero. Thus, this condition, commonly referred to as zero-current switching, is desirable. With series resonant converters the most significant loss is conduction loss; however conduction losses are not strongly related to operating frequency and therefore the series resonant converter can operate efficiently at a high frequency. For example, a resonant converter can be designed to operate efficiently at a frequency that is typically five to ten times higher than a PWM converter of the same power level using the same power switching devices.

A resonant converter is further advantageous as it produces little EMI. Because a resonant converter develops a sinusoid of current, as opposed to a fast rising quasi-square wave, little EMI is produced. Further, the components of the resonant converter are generally fewer in number and less costly than the components required for PWM. The resonant converter's components are also of a smaller volume and weight thereby permitting applicability of the converter in a smaller or more weight sensitive environment than is possible with PWM.

Control or regulation of the output DC voltage of a series resonant converter may be achieved by controlling the capacitance of the resonant capacitor of the circuit, the inductance of the resonant inductor of the circuit, the peak voltage, or the operating frequency of the circuit. Because the peak voltage is usually clamped to the power source and because it is difficult to continuously control capacitance or inductance directly, the operating frequency is usually controlled. Numerous embodiments of resonant converters wherein the operating frequency is controlled are discussed and disclosed in U.S. Pat. No. 4,679,129. Another frequency-controlled resonant connector is disclosed in U.S.

Pat. No. 4,642,745. In U.S. Pat. No. 4,642,745, an AC signal of a frequency greater than that of the AC power line is controlled to vary both the input current to the converter and the converter's output current. Both the duty cycle and the frequency of the AC signal are controlled to control the converter's output.

One of the problems encountered with frequency-controlled resonant converters is the potential for generating audible noise. To control power over a suitable range, a wide range of frequencies is required for such frequency control. Frequency-controlled power converters, such as that disclosed in U.S. Pat. No. 4,679,129, have been developed to eliminate the problem of generation of audible noise. However, to avoid such noise generation, additional circuitry is added to the basic resonant power converter. The additional circuitry is undesirable as it adds to the manufacturing cost of the converter and increases the potential for degradation of reliability of the converter. Therefore, it is desired to develop a controlled resonant power converter which does not generate audible noise. It is also desired to develop a converter which is comprised of a minimal number of components, and in particular, is comprised of a minimal number of high power components which are expensive and often consume significant volume and space so as to adversely affect the size of packaging required for the converter.

In addition to single output applications, there are instances in which it is desirable to provide multiple outputs from a single power source. Consider, for example, the development of pure electric and hybrid electric vehicles, such as automobiles, in which electric power from a single source is used to supply power to numerous subsystems. Such subsystems may include a battery charger, auxiliary loads such as lights, and heating, ventilation and air-conditioning (HVAC) subsystems. Another example of a multiple output power application is the personal computer wherein several subsystems, such as a card rack, hard disk drive, and floppy disk drive, are to be driven by a single power supply.

The provision of power to multiple outputs from a single power supply is complicated in the event each output requires separate control or regulation. In the above-mentioned electric vehicle example, for instance, the power supplied to auxiliary loads may be required to be a standard 12 volt DC signal while the HVAC subsystem requires a signal voltage greater than 12 volts DC. When using prior art resonant converters in multiple output applications wherein each output is to be independently regulated, cost savings resulting from implementation of a single power supply may be negated by the need to provide separate mechanisms for regulating each of the outputs.

Separate regulating mechanisms are generally required for each output as the regulators adjust the input to a transformer. For example, when using a PWM inverter to drive a high frequency isolation transformer, each output requires a separate PWM inverter for independent load control and regulation. The need for each output to become associated with its own regulation stage results in an increase in cost and a degradation of reliability due to the number of components required for independent control of each output.

For resonant converters, in which regulation is achieved by controlling the operating frequency, separate regulation is also generally required for each output in a multiple output application. An improved dual output DC—DC converter is disclosed in U.S. Pat. No. 4,628,426. In this converter, control of one of the outputs is achieved by pulse-width modulation while control of the other output is accomplished by frequency adjustment. The converter of U.S. Pat. No. 4,628,426 is advantageous over some multiple output converters in that only a single power switching stage is required for both outputs rather than requiring a power switching stage for each output. However, if more than two independently controlled outputs are required in an application of the converter of U.S. Pat. No. 4,628,426, additional conventional regulators are used to support the additional outputs. It is therefore desired to provide a resonant circuit for use in a multiple output power conversion application that limits the number of regulatory components required to provide independent control of each output to thereby minimize the cost of the circuitry and also reduce potential degradation of reliability of the circuit. Under ideal circumstances, it is preferable to utilize only one power switching stage for the support of a multitude of independently controlled outputs.

In addition to the problems associated with independent control of each output in a multiple output application, control of single or multiple outputs in some applications is generally limited. Consider, for example, the relationship between the desired output voltage and the desired output current. As previously stated herein, an advantage of series resonant converters is the ability to obtain a relatively constant output current over a range of output voltages. However, at a particular output voltage (i.e., when the output voltage at which the input/output voltage transformation ratio is unity which is referred to herein as the "output voltage threshold"), the output current of the converter drops rapidly to zero. Therefore, beyond the output voltage threshold, essentially no current is output from the converter. This current characteristic is troublesome when the input voltage to the converter decreases. Specifically, a decrease in input voltage results in lower output current over a narrower range of output voltage, i.e., up to a lower output voltage threshold. Thus, if input voltage decreases, it may not be possible to achieve the desired output current, or any current at all, at a particular value of output voltage. For example, upon startup of a power supply, such as a motor vehicle power supply, the initial input voltage provided to the converter is less than during normal operation. Therefore, at power-up, insufficient (i.e. essentially zero) current may result at the required output voltage to drive the load connected to the output. It is therefore desired to provide controllable power conversion circuitry which yields output current beyond the output voltage threshold of conventional series resonant converters. In this manner, the converter yields sufficient output current to drive a load connected to the converter's output under lower input voltage circumstances than is possible with conventional power conversion circuitry.

The above desirable converter characteristics are to a large extent accomplished by a resonant circuit using a controlled transformer as set forth in my U.S. patent application Ser. No. 08/316,969 entitled "CONTROLLED-K RESONATING TRANSFORMER." It is often desirable, however, to achieve the same advantages in circuits which do not necessarily require a tranformer. Even where transformers are used, it is sometimes desirable to use conventional transformer designs which do not have the same design considerations as a controlled transformer.

SUMMARY OF THE INVENTION

An object of the invention is to regulate the output of a resonant converter operating at a fixed switching frequency in which the use of a transformer is optional. Another object in such a converter is to provide multiple regulated outputs. Another object in such a converter is to produce a minimum of EMI. Still another object in such a converter is to yield output current beyond the output voltage threshold of conventional series resonant converters.

The present invention provides an LC resonant circuit comprising a resonant capacitor, a series inductor and a control inductor in parallel with the capacitor. The circuit may be employed in both single output and multiple output power conversion applications. Use of the circuit in multiple output applications provides a mechanism by which each output may be independently regulated at a lower manufacturing cost, with improved reliability and with smaller packaging required of the converter when compared to prior art multiple output power converters. Also, output current may be generated at lower values of input voltage when compared to conventional series resonant converters.

The invention comprises, in one form thereof, an LC resonant circuit driven by an AC supply and comprising a resonant capacitor and a series inductor. The effective capacitance of the capacitor is variable due to a controlled inductor in parallel with the capacitor. A load is coupled to the resonant circuit either directly or through a transformer. The load may be in series with the LC elements to form a series resonant circuit or in parallel with one of them to form a parallel resonant circuit. The controlled inductor includes a magnetic core and a power winding and a control winding wound on the core. The power winding is connected in parallel with the resonant capacitor of the resonant circuit. The control winding induces flux in the core in response to the application of direct current thereto to thereby control the core permeability and thus the inductance of the power winding, i.e., the direct current establishes the operating region on the permeability curve. The power winding is in resonance with the capacitor at the AC supply frequency or higher, dependent on the effect of the control winding, to influence the effective capacitance of the capacitor and thereby control the output of the resonant circuit. More than one controlled LC circuit can be driven by an AC supply, each regulated by a controlled inductor to afford multiple outputs.

The AC supply for the above described circuit may be a half-bridge inverter comprising a pair of power switches supplied by a DC source. Another common type of AC supply is a full bridge inverter having four power switches. It may then be profitable to use a symmetrical LC circuit having a controlled resonant circuit circuit on each side of the load. For the symmetrical circuit a power winding for each resonant circuit is wound on a common core and controlled by a single control winding. Thus the controlled inductors may have either one or two power windings.

Regulation of the converter output is accomplished by a feedback circuit for comparing the output voltage to a standard desired voltage to generate a difference voltage, and producing a control current which modifies the power winding inductance sufficiently to reduce the difference voltage to zero.

BRIEF DESCRIPTION OF THE DRAWINGS

The above-mentioned and other features and advantages of this invention, and the manner of attaining them, will become more apparent and the invention will be better understood by reference to the following descriptions of embodiments of the invention taken in conjunction with the accompanying drawings, wherein:

FIG. 2 is a schematic diagram of a power conversion circuit embodiment comprising a series resonant converter directly coupled to a load without a transformer, according to the invention;

FIG. 3 is a schematic diagram of a power conversion circuit embodiment comprising a parallel resonant circuit, according to the invention;

FIGS. 8B and 9B are schematic diagrams of the controlled inductors of FIGS. 8A and 9A, respectively;

FIG. 10A is an isometric view of an embodiment of the controlled inductor of the present invention consisting of two toroidal core halves mated at the equator of the core;

FIG. 10B is an isometric view of one of the core halves of FIG. 10A; and

FIG. 10c is a schematic diagram of the controlled inductor of FIG. 10A.

DETAILED DESCRIPTION OF THE INVENTION

The ensuing description is directed to the use of controlled resonant inductors in series or parallel resonant converters, however it should be recognized that the invention applies as well to various quasi-resonant and series/parallel hybrid resonant converter configurations.

Figure 1:
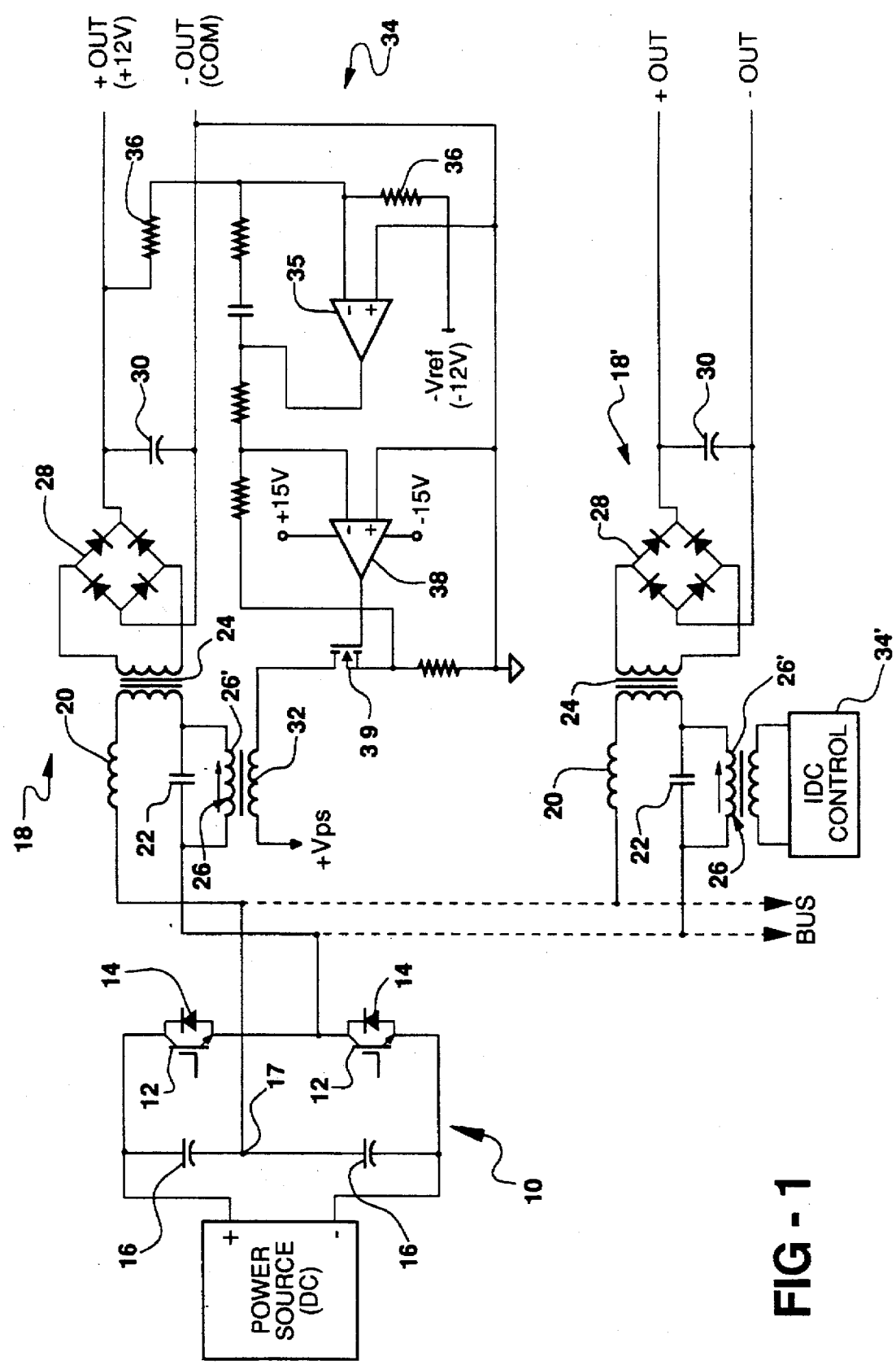
FIG. 1 is a schematic diagram of a power conversion circuit providing multiple regulated outputs from a single power supply and comprising series resonant circuits with controlled inductors according to the invention, and depicting an embodiment of a regulating circuit.

Referring to FIG. 1, a fixed frequency AC supply 10 consists of a DC power source, a half-bridge inverter consisting of power switches 12 with anti-parallel diodes 14 and a pair of capacitors 16 across the DC source to form an AC drive center point 17. The switches are controlled by a clock circuit, not shown, and may be for example IGBTs or MCTs (MOS controlled thyristors) which may operate up to 500 kHz, or power MOSFETs which may operate at frequencies as high as 10 MHz.

A resonant converter 18 driven by the AC supply 10 includes a series tank circuit which comprises an inductor 20 in series with a resonant capacitor 22, the primary winding of a transformer 24 and the AC supply. A parallel tank circuit comprises the capacitor 22 and a controlled inductor 26 in parallel with the capacitor. The transformer secondary winding is coupled by a diode bridge 28 to a filter capacitor 30. The filtered output of the bridge 28 comprises the DC output of the resonant converter.

The controlled inductor 26 can be varied through a wide range of inductance by a DC current in its control winding 32, and has the effect of varying or adjusting the effective capacitance of the resonant capacitor 22. The output voltage of the converter then can be regulated by suitable control of the inductor. The power winding 26' of the controlled inductor is wound on a core with the control winding. One end of control winding 32 is connected to Vps, a small unregulated DC voltage source of say, 3 to 12 volts, such as +out (12V). The other end of control winding 32 is connected to regulating circuit 34, which controls the control winding current to create controlled flux in the core, which biases the core to an operating region on its permeability curve to effectively establish core permeability. The current is continuously variable from zero to a saturation value so that the permeablity can vary from a maximum value for high inductance at approximately zero current to a low value and low inductance at high current.

The regulating circuit 34 compares the output voltage, which is 12 volts in this example, to a 12v reference. One input of an error amplifier 35 is connected to the ground line of the output and the other input is connected to the reference and the positive output through equal resistors 36 to obtain a null when the output equals the reference. Any deviation from the reference is reflected in the amplifier 35 output and fed to another amplifier 38 for gain. The output drives a FET 39 which is in series with the control winding 32 and a 3v bias.

In the preferred operating mode the switches 12 have equally spaced on times and are each turned on for between 25% and 45% of the total period. The short on-time is used when the resonant tank loads on the supply do not require greater on-time. Approximately 45% on-time is used when the loads require it. The series tank circuit comprising inductor 20 and capacitor 22 is designed to resonate at approximately twice the operating frequency of the power supply, and the parallel tank circuit comprising capacitor 22 and the controlled inductor 26 is designed such that when the inductor 26 is at its minimum value (maximum control current) parallel resonance is achieved at the operating frequency.

As is apparent from FIG. 1, more than one series resonant converter circuit may be operated from the same fixed frequency power supply 10. Specifically, a second resonant circuit 18' essentially like the first circuit 18 is also coupled to the AC supply. The second circuit (and others) may however be regulated to a different output voltage. A regulating circuit 34', equivalent to the regulating circuit 34, is shown in the drawing as a block called IDC Control. The transformers 24 in the output circuits are for isolation and step-up and/or step-down. They can have the same or different power capacities and transformation ratios.

In the operation of the inverter 10, the capacitors 16 form an AC drive center point and are very much greater in capacitance than the capacitor 22 and thus are essentially uninvolved in the resonant actions of the output tanks. The inverter produces a quasi-square wave of voltage at a fixed operating frequency. Every output tank circuit is driven by this waveform. Each resonant tank adds current to the switches 12, but it produces a negligible change of the voltage waveform which the switches impress upon the other tanks.

In the operation of the resonant output circuits 18 and 18', the inductor 20, the capacitor 22 and the transformer leakage inductance form a series resonant power tank circuit. The controlled inductance 26 across the capacitor 22 has a design which permits its inductance to be controlled over a range of typically up to 100 to 1 or more. The output voltage of the circuits 18 and 18' are controlled by varying the inductance of the respective controlled inductors 26. Varying the controlled inductor can be viewed as making the capacitor 22 into a variable capacitor. The series tank is tuned to be resonant at approximately twice the operating frequency of the fixed frequency square wave produced by the inverter 10. Although not always necessary, this causes zero-current switching. Minimum EMI is attained at this condition. When desired, however, the series tank resonant frequency may be less than twice the operating frequency, although this leads to "hard switching" and greater EMI.

To achieve maximum output, the inductance of the controlled inductor 26 is made a maximum, i.e., approximately zero control current in the control winding 32. Then the impedance of the controlled inductor is typically at least 100 times that of the capacitor 22. When at its minimum inductance, the controlled inductor has little effect on the operation and output of the series resonant circuit. To achieve minimum output, the controlled inductance is made a minimum so that it resonates with the capacitor 22 at the operating frequency. This effectively places a high impedance in series with the series tank and reduces the output to a minimum.

As a variant, the transformer primary winding could be used as the resonant inductor instead of the separate inductor 20. In that case the transformer would be designed with leakage inductance sufficient for the series tank circuit.

The resonant converter circuits do not necessarily include a transformer. In FIG. 2, for example, the diode bridge 28 is directly coupled to the series tank comprising inductor 20 and capacitor 22. The variable inductor 26 symbol in this Figure implies the variable inductor as described for FIG. 1 as well as the Idc control 34'. This circuit can also be expressed in a multiple output configuration.

FIG. 3 illustrates a parallel resonant converter using a transformer. The components and the circuit configuration is the same as in FIG. 1 except that the resonant capacitance is distributed in two capacitors 22a and 22b. The controlled inductor 26 is in parallel with the capacitor 22a and the primary winding of the transformer 24 is connected across the capacitor 22b. The transformer is optional so that alternatively the diode bridge 28 is connected across the capacitor 22b. In another configuration the load could be connected across the inductor 20.

Figure 4:
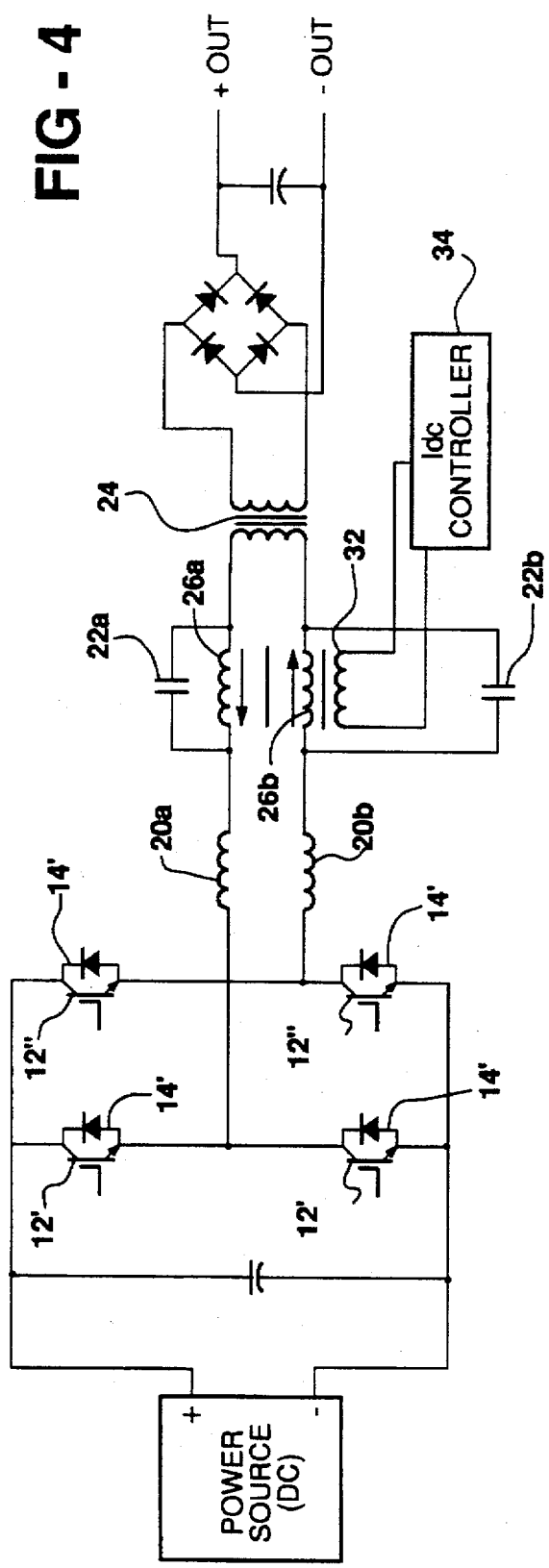
FIG. 4 is a schematic diagram of a power conversion circuit embodiment having a full bridge power supply and a symmetrical series resonant circuit, according to the invention.

A symmetrically driven resonant power supply using controlled resonating inductors is shown in FIG. 4. A fixed frequency AC supply 10' includes a full-bridge inverter comprising two pairs of power switches 12' and 12" with anti-parallel diodes 14' and a DC source for the bridge. The junction of one pair of switches 12' is connected through an inductor 20a and a resonant capacitor 22a to one side of the transformer 24 primary, and the junction of the other pair of switches 12" is connected through an inductor 20b and a resonant capacitor 22b to the other side of the primary. A controlled inductor power winding 26a is coupled across the capacitor 22a and another controlled inductor power winding 26b is coupled across the capacitor 22b. Both power windings 26a, 26b are wound on the same core along with a single control winding 32 supplied by the Idc controller 34 to assure symmetry in the circuit even upon change of inductance for purposes of regulation.

FIGS. 5A–10C show several implementations of controlled resonating inductors. All use the addition of a unipolar flux to control the permeability of the cores. This "DC" flux is represented in the figures by the component of flux labeled as B. The direction of the flux B depends on the polarity of the source of current which is used for control. The actual direction of the flux B is inconsequential. For purposes of control, the amplitude of the flux B is varied from a low, which is typically zero, to a high, which is typically achieved in manganese-zinc ferrite with a coercive force of approximately 20 to 30 Oersteds.

In all cases, the bipolar flux is represented by the component of flux labeled as A. This "AC" flux, although shown in one direction to facilitate understanding of the interaction of the "DC" and "AC" components of flux, reverses direction at a multiple, typically one, of the operating frequency. The amplitude of the flux A is typically quasi-sinusoidal at the operating frequency and its peak value is much less than the maximum value of the flux B.

Figure 5B:
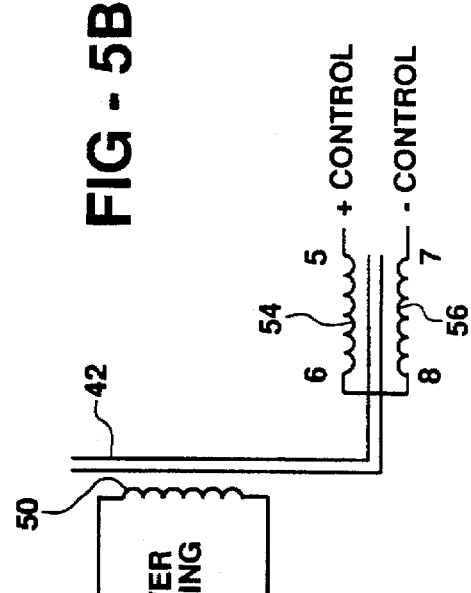
FIG. 5B is a schematic diagram of the controlled inductor of the embodiment of FIG. 5A.
Figure 5A:
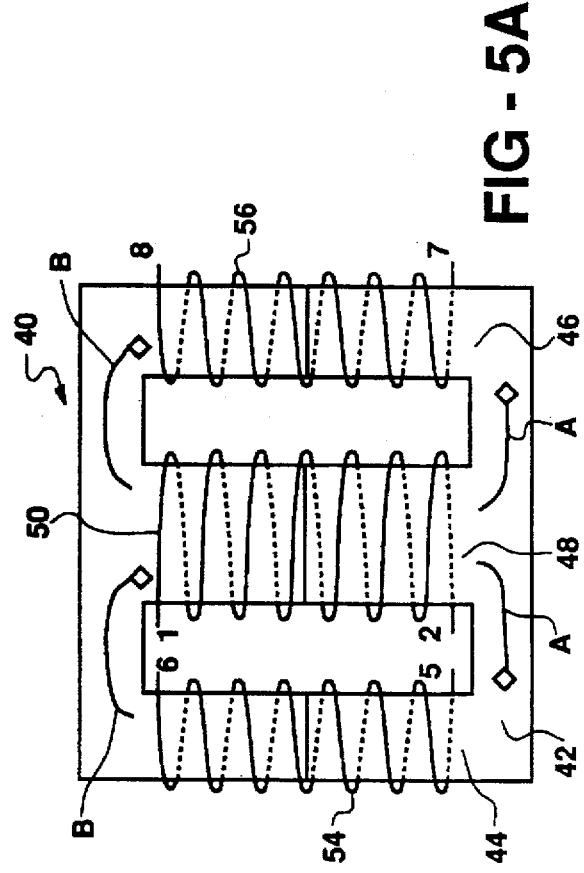
FIG. 5A is front view of one embodiment of the controlled inductor of the present invention with a single power winding suitable for the circuits of FIGS. 1–3, wherein the core is E-shaped and the control winding comprises two DC windings.

FIGS. 5A and 5B show an approach to winding a resonant inductor 40 with an additional winding for control. The inductor 40 has an E-shaped core 42 with outboard legs 44 and 46 and a central leg 48. A power winding 50 having ends 1 and 2 is wound on the central leg 48 and a control winding comprises a first section 54 (having ends 5 and 6) on leg 44 and a second section 56 (having ends 7 and 8) on leg 46. The phasing of the sections 54 and 56 is important. The control windings are designed to provide a DC amp-turn product adequate to drive the core material into deep saturation at the maximum value of control current. The control current produces the B flux in the core which determines the operating region on the permeability curve and thus is continuously variable from zero current to achieve maximum permeability to a saturation current which effects low permeability.

As opposed to a magnetic amplifier or saturable reactor, the controlled resonating inductor uses unipolar saturation. Since its core does not switch, it operates with relatively low power loss and noise. The control winding is a series or parallel connection of two winding sections, which is phased so that the voltages induced in the two sections cancel except for some small harmonic components. Thus primarily the DC control current with a small component of alternating current flows in the control winding.

The power winding is designed to produce the minimum required value of inductance. With deep saturation of the core material, to a first approximation, the minimum inductance can be estimated as that value which the same winding would have in space-geometric winding inductance. Normally, to produce a controlled inductor with maximum power handling capacity (VA rating) for a given core, the power winding should be uniformly distributed over the full length of the center leg 48. However the minimum value of inductance for a given density of DC control flux can be varied, not only by changing the number of turns, but by varying the distribution of these turns over the center leg.

The specific type of wire used for the power winding must by chosen for its current handling capacity at the particular operating frequency. While it is possible to use the controlled inductors of this disclosure at operating frequencies which might range from sub-audible to 100 MHz, typical operating frequencies range from 10 kHz to 10 MHz. Over the typical range, litz wire or thin foil windings have been found to be most suitable as they can reduce proximity and skin effect losses in the power winding. As the AC component of current in the control winding is inherently low, it can be generally be wound with conventional magnet wire. However, as the AC voltage induced in each winding section of a control winding which uses phase cancellation (as in FIGS. 4A and 4B) can be high, in some designs wire with high voltage insulation (such as quad insulated polythermaleze) may be necessary. These winding considerations generally apply to the other controlled inductor configurations of this disclosure as well.

It is important to note that when a controlled inductor operates in a parallel resonant control tank, the determination of its power rating requirement needs special consideration. The voltage rating requirement is determined by its operation at its maximum inductance—where the bipolar flux in its core is at a maximum. However, at its maximum inductance, the copper loss—including that in the control winding—is at a minimum.

The current rating requirement is determined by the controlled inductor's operation at its minimum inductance. Here the parallel resonant control tank operates at or near resonance. The current which circulates within this tank and the current flowing in the DC bias winding are at their maximum values. The "AC" flux excursions in the core material are small: therefore, the core losses are at a minimum. The core loss maximum occurs at a moderate value of "DC" flux.

Thus it may be seen in a typical design, where the maximum value of the core loss is approximately equal to the maximum value of the total winding loss, that the worst case for the total loss occurs at an operating point between maximum and minimum inductance.

The controlled inductor configurations described below provide two power windings. These are advantageous in circuits which use symmetrical full-bridge drive as shown in FIG. 4. The greatest advantage of using such an inductor in a symmetrical circuit is that using a single, dual winding inductor in lieu of two, somewhat smaller, single winding inductors tend to reduce cost, packaging volume, and weight. There is also the advantage that the coupling of the dual winding unit inherently tends to force equality of control and the matching of the waveforms which are associated with the components on one side of the load when compared with those on the other side of the load. This is best implemented in any of the configurations below by using bifilar windings; that is, the two power windings are wound together on the core to assure close coupling. Most of the drawings show the windings separated, however the bifilar power windings are shown in FIG. 6C.

Figure 6A:
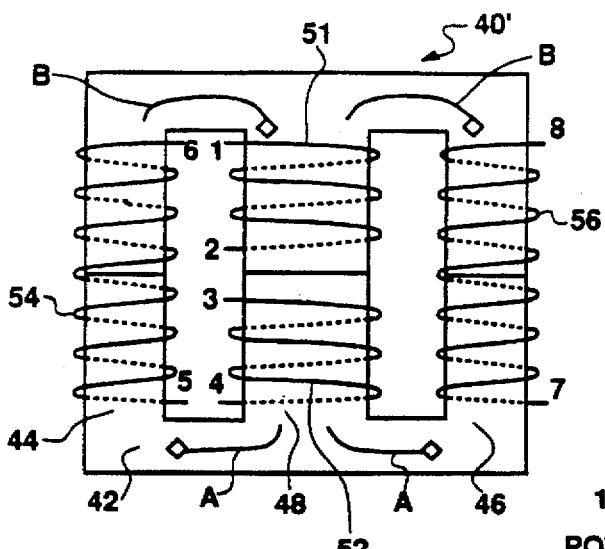
FIGS. 6A, 6C, and 7A are front views of additional embodiments of the controlled inductor of the present invention wherein the core is E-shaped and has two power windings suitable for the circuit of FIG. 4.
Figure 6B:
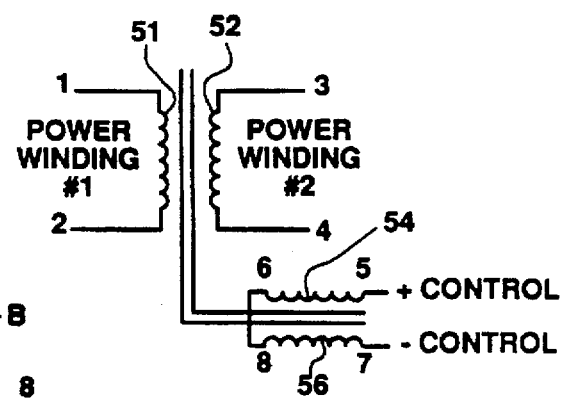
FIGS. 6B and 7B are schematic diagrams of the controlled inductors of FIGS. 6A and 7A, respectively.
Figure 6C:
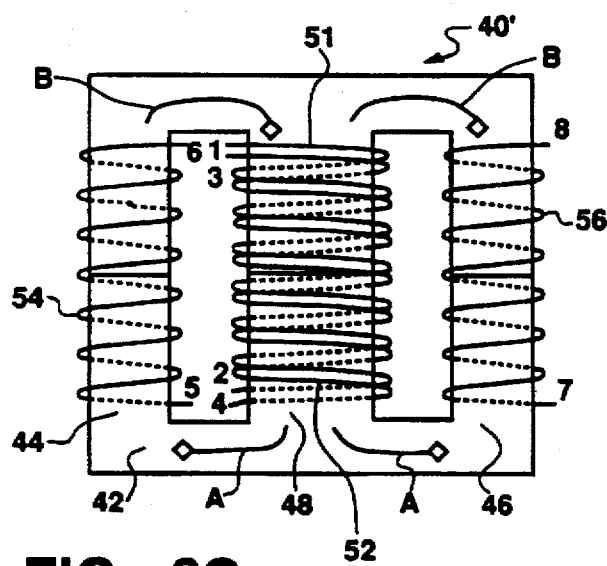

FIGS. 6A and 6B are the same as FIGS. 5A and 5B except for the two power windings, both wound on the central leg 48. The inductor 40' has a first power winding 51, having ends 1 and 2, on the upper portion of the leg 48 and a second power winding 52, having ends 3 and 4, on the lower portion of the leg 48. It will be seen that changes in the control current will affect the two power windings equally and simultaneously. The power windings can be wound so that their coupling is quite loose, as shown in the drawing, or they can be wound so that the coupling is much tighter, e.g., bifilar wound as in FIG. 6C. In either case the coupling (coefficient K) depends strongly on the DC control flux.

Figure 7A:
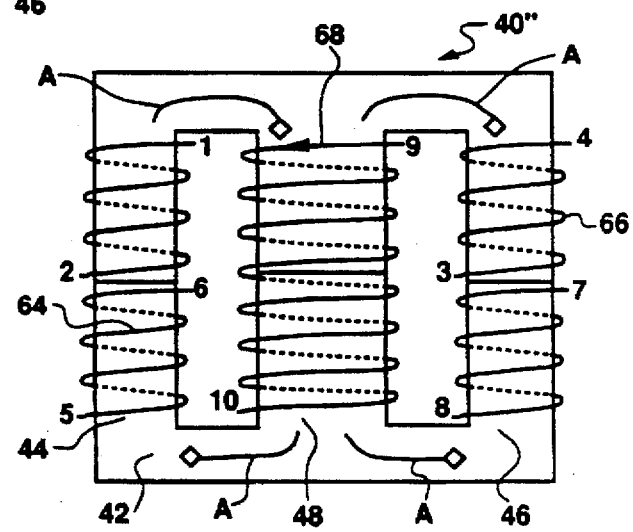
Figure 7B:
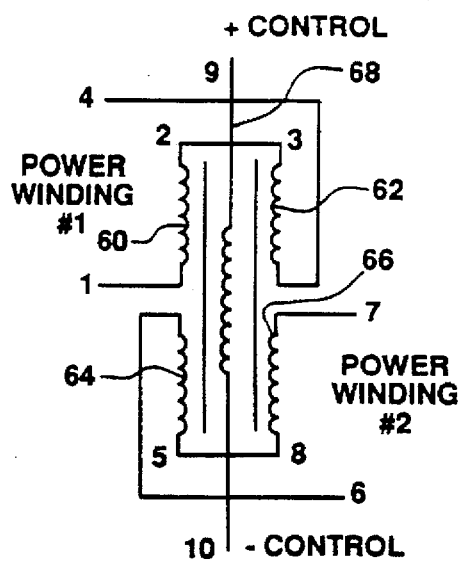

Another E-shaped core 42 is used in the inductor 40" shown in FIGS. 7A and 7B. A single control winding 68 is wound on the center leg 48 and the power windings sections 60–66 are wound on the outboard legs. A power section 60, having ends 1 and 2 is wound on leg 44 and is serially coupled to a power section 62, having ends 3 and 4 on the leg 46. Similarly, a power section 64, having ends 5 and 6, is on leg 44 and is serially connected to a power section 66, having ends 7 and 8, on leg 46. This configuration produces very little induced AC voltage turn-to-turn in the control winding. If desired the power sections by all be connected in a single power winding for applications like that of FIG. 1 which requires a single power winding.

Figure 8A:
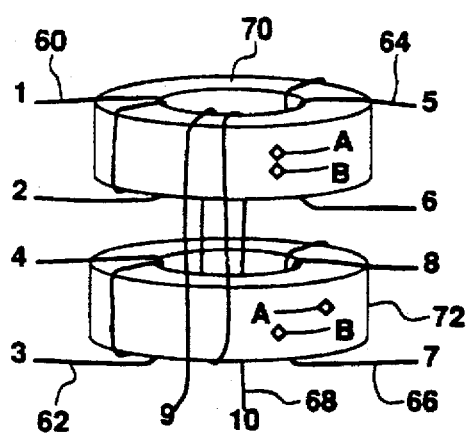
FIGS. 8a and 9A are isometric views of other embodiments of the controlled inductor of the present invention having two toroidal cores and two power windings.
Figure 8B:
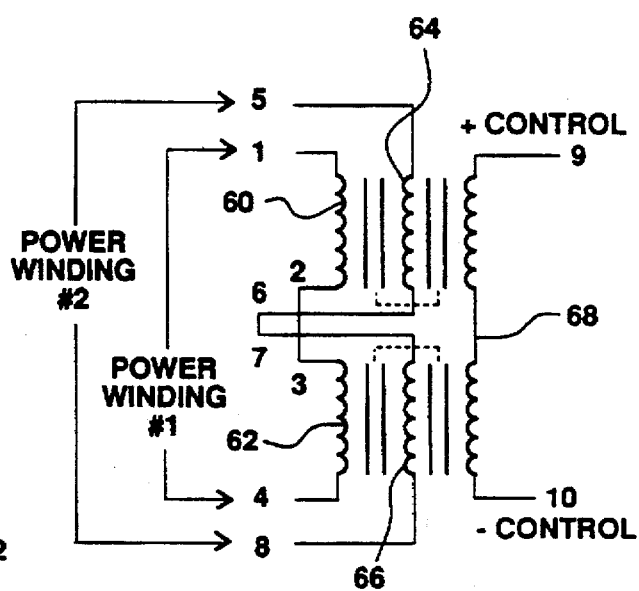

FIGS. 8A and 8B illustrate a pair of toroidal cores 70 and 72, each with circular flux paths for flux A and B. A first power winding section 60, having ends 1 and 2, is wound on one side of core 70 and a second power winding section 62, having ends 3 and 4, is wound on one side of core 72. The sections 60 and 62 are joined to form one power winding. A third power winding section 64, having ends 5 and 6, is wound on core 70 opposite the section 60 and a fourth power winding section 66, having ends 7 and 8, is wound on core 72 opposite section 62. The sections 64 and 66 are joined to form another power winding. A control winding 68 is wound around both cores 70 and 72. This configuration produces very low induction in the control winding. It can be use in multiples of two toroidal cores.

Figure 9A:
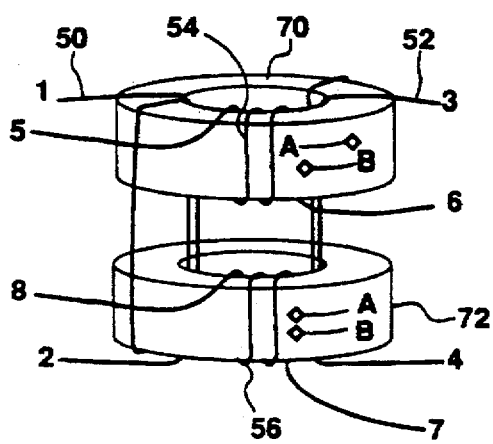

FIGS. 9A and 9B show a structure like that of FIG. 8 but with different windings. The first power winding 50, having ends 1 and 2, is wound around both cores on one side, and the second power winding 52, having ends 3 and 4, is wound around both cores at the other side. The control winding has a first section 54, having ends 5 and 6, wound on core 70 and a second section 56, having ends 7 and 8, wound on core 72, the sections being connected in series. In this configuration a large AC voltage is developed in each of the two control winding sections. Bifilar windings of the power windings in the FIG. 9A embodiment were found to be particularly useful. The two toroidal core designs disclosed here have much better control bandwidth than those with the E-shaped cores.

A controlled inductor 90, shown in FIGS. 10A, 10B and 10C, uses orthogonal control flux to vary core permeability. A toroidal core comprises two core halves 92 and 94 which mate at a mid-plane. As shown in FIG. 10B an annular cavity in core half 92 contains the control winding 100 with only the coil ends 5 and 6 extending out through an aperture in the core half. With the core halves mated a first power winding 96, having ends 1 and 2, is wound on one side of the core and a second power winding 98, having ends 3 and 4, is wound on the other side of the core. A shown by the flux lines A and B, the "AC" flux circulates around the toroid and the "DC" flux B is parallel to the toroid axis or orthogonal to the "AC" flux. This design may be implemented with one or two power windings wound on one or more cores, each core having its own imbedded control winding. This yields minimal AC induction in the DC control winding and the least surrounding flux (leakage) field—if the power windings are uniformly distributed over 360 degrees. On the other hand, the orthogonal flux control causes relatively little change in permeability on the path of the "AC" flux and thus has a limited range of control of inductance (generally less than 5 to 1).

It will thus be seen that resonant converters to produce one or more regulated outputs from a single AC power supply can be made for efficient power conversion using a small number of components for reduced size packages and lower expense as compared to prior resonant converter configurations. Moreover, the large control range of the controlled inductor and use of transformers with low magnetizing inductance make possible output current beyond the output voltage threshold of conventional series resonant converters; thus the converter yields more output current under lower input voltage than is possible with conventional power conversion circuitry.

The embodiments of the invention in which an exclusive property or privilege is claimed are defined as follows:

1. A resonant converter having a fixed frequency AC supply and an LC resonant circuit driven by the supply to yield a DC output, the resonant circuit including:
   a series tank circuit including a resonant capacitor in series with a first inductor;
   a parallel tank circuit including a controlled inductor connected in parallel with the resonant capacitor for varying the effective impedance of the capacitor;
   the controlled inductor comprising a power winding on a core and a control winding; and
   a control circuit including the control winding for continuously controlling the permeability of the core to thereby vary the inductance of the controlled inductor to regulate the DC output.

2. The invention as defined in claim 1 wherein the resonant converter includes a plurality of LC resonant circuits driven by the same AC supply and independently controlled to produce separate outputs.

3. The invention as defined in claim 1 wherein a load is connected in series with the capacitor and the first inductor to form a series resonant converter.

4. The invention as defined in claim 1 wherein a load is coupled in parallel with one of the capacitor and the first inductor to form a parallel resonant converter.

5. The invention as defined in claim 1 wherein the resonant circuit includes a transformer having its primary winding coupled to the capacitor and first inductor and its secondary winding coupled to a rectifier and a filter to yield the output.

6. A resonant converter having an AC supply with a fixed operating frequency and an LC resonant circuit driven by the supply to yield a DC output, the resonant circuit including:
   a capacitor coupled to a first inductor and tuned to resonance at approximately twice the operating frequency;
   a controlled inductor having a power winding connected in parallel with the capacitor for varying the effective impedance of the capacitor, the controlled inductor having a variable permeability core and a minimum inductance in resonance with the capacitor at the operating frequency; and
   a control circuit for continuously controlling the inductance of the controlled inductor to thereby regulate the DC output.

7. The invention as defined in claim 6 wherein the controlled inductor comprises:
   a magnetic core;
   the power winding being wound on the core; and
   a control winding being wound on the core, the control winding being coupled to the control circuit for producing flux in the core in response to the application of direct current thereto to influence the inductance of the power winding.

8. The circuit of claim 6, wherein:
   the controlled inductor has an E-shaped core having first, second and third legs, the third leg positioned between the first and second legs, and wherein the power winding of the inductor is wound about the third leg; and
   the control winding comprises first and second interconnected DC control windings, the first DC control winding wound on the first leg and the second DC control winding wound on the second leg.

9. A resonant converter having a fixed frequency AC supply and a symmetrical LC resonant circuit driven by the supply to yield a DC output, the resonant circuit including:

a transformer having a primary winding;

a capacitor and an inductor serially connecting each side of the primary winding to the AC supply;

a controlled inductor having a pair of power windings each connected in parallel with one of the capacitors for varying the effective impedance of the capacitors, and having a control winding; and a control circuit for continuously controlling the control winding of the controlled inductor to thereby regulate the DC output.

10. The invention as defined in claim 9 wherein the controlled inductor comprises:

a magnetic core;

the power windings and the control winding being wound on the core, the control winding producing flux in the core in response to the application of direct current thereto to determine the inductance of the power windings.

11. The invention as defined in claim 9 wherein the controlled inductor comprises:

a magnetic core;

the power windings being bifilar wound on the core, the control winding producing flux in the core in response to the application of direct current thereto to determine the inductance f the power windings.

12. The circuit of claim 9, wherein:

the controlled inductor has an E-shaped core having first, second and third legs, the third leg positioned between the first and second legs, and wherein the power windings of the inductor are wound about the third leg; and the control winding comprises first and second interconnected DC control windings, the first DC control winding wound on the first leg and the second DC control winding wound on the second leg.

13. The circuit of claim 9, wherein:

the controlled inductor has an E-shaped core having first, second and third legs, the third leg positioned between the first and second legs, and wherein the control winding of the inductor is wound about the third leg; and the power windings comprise a first power winding having a first section wound on the first leg and a second section wound on the second leg, and a second power winding having a first section wound on the first leg and a second section wound on the second leg.

14. The invention as defined in claim 9, wherein the inductor has a core comprising first and second toroidal cores having centers which are axially aligned, wherein a first power winding is wound on both the first and second toroidal cores on the same side of the centers thereof, and a second power winding is wound on both the first and second toroidal cores on the same side of the centers thereof and opposite the first power winding; and the control winding comprises first and second interconnected DC control windings, the first DC control winding wound on the first toroidal core between the first power winding and the second power winding, and the second DC control winding wound on the second toroidal core between the first power winding and the second power winding.

15. The invention as defined in claim 9, wherein the inductor has a core comprising first and second toroidal cores having centers which are axially aligned, wherein first and second power windings are bifilar wound on both the first and second toroidal cores; and the control winding comprises first and second interconnected DC control windings, the first DC control winding wound on the first toroidal core between the first power winding and the second power winding, and the second DC control winding wound on the second toroidal core between the first power winding and the second power winding.

16. The invention as defined in claim 9 wherein the inductor has a core comprising first and second toroidal cores having centers which are axially aligned, and wherein:

the first power winding of the transformer comprises first and second power sections electrically connected in series, the first power section wound on one side of the center of the first toroidal core and the second power section wound on the same side of the center on the second toroidal core;

the second power winding comprises third and fourth power sections electrically connected in series, the third section wound on the first toroidal core opposite the first power section, and the fourth power section wound on the second toroidal core opposite the second power section; and the control winding is wound on both the first and second toroidal cores between the first and second toroidal cores between the first power section and the second power section on the first toroidal core and between the third power section and the fourth power section on the second toroidal core.

17. The invention as defined in claim 9 wherein:

the inductor has a core comprising first and second toroidal core halves having centers which are axially aligned, said core halves being joined at an interface in a plane transverse to the core axis;

the core includes an annular internal cavity at said interface and disposed about the axis of the core;

the control winding disposed in the cavity; and said first power winding wound on one side of said core in a direction perpendicular to said control winding and said second power winding wound on the other side of said core in a direction perpendicular to said control winding.

18. The invention as defined in claim 9 wherein:

the inductor has a core comprising first and second toroidal core halves having centers which are axially aligned, said core halves being joined at an interface in a plane transverse to the core axis;

the core includes an annular internal cavity at said interface and disposed about the axis of the core;

the control winding disposed in the cavity; and said first and second power windings being bifilar wound on the core in a direction perpendicular to said control winding.

* * * * *